United States Patent
Yamamoto et al.

(10) Patent No.: US 10,178,299 B2
(45) Date of Patent: Jan. 8, 2019

(54) CONTROL DEVICE AND CONTROL METHOD

(71) Applicant: SONY CORPORATION, Tokyo (JP)

(72) Inventors: Kouji Yamamoto, Kanagawa (JP); Akira Iwase, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/314,774

(22) PCT Filed: Jun. 10, 2015

(86) PCT No.: PCT/JP2015/002913
§ 371 (c)(1),
(2) Date: Nov. 29, 2016

(87) PCT Pub. No.: WO2015/194130
PCT Pub. Date: Dec. 23, 2015

(65) Prior Publication Data
US 2017/0201674 A1 Jul. 13, 2017

(30) Foreign Application Priority Data
Jun. 17, 2014 (JP) .................. 2014-124439

(51) Int. Cl.
H04N 5/232 (2006.01)
H04N 5/262 (2006.01)
H04N 5/272 (2006.01)

(52) U.S. Cl.
CPC ..... *H04N 5/23212* (2013.01); *H04N 5/23229* (2013.01); *H04N 5/23293* (2013.01); *H04N 5/262* (2013.01); *H04N 5/272* (2013.01)

(58) Field of Classification Search
CPC ............. H04N 5/23293; H04N 5/23212
See application file for complete search history.

(56) References Cited

U.S. PATENT DOCUMENTS

| 5,031,049 A | 7/1991 | Toyama et al. |
| 2003/0117511 A1* | 6/2003 | Belz ............... H04N 1/0044 348/333.11 |

(Continued)

FOREIGN PATENT DOCUMENTS

| JP | 2006-086799 A | 3/2006 |
| JP | 2007-214845 A | 8/2007 |

(Continued)

OTHER PUBLICATIONS

Office Action for CN Patent Application No. 2014-124439, dated Feb. 6, 2018, 05 pages of Office Action and 03 pages of English Translation.

(Continued)

Primary Examiner — Ahmed A Berhan
(74) Attorney, Agent, or Firm — Chip Law Group

(57) ABSTRACT

An information processing apparatus includes circuitry that outputs a first image for display with a first indicator that identifies an initial focus position within a scene of the first image and a second indicator that identifies at least one focus position that is in front of or behind the initial focus position within the scene. The first indicator display is updated in response to an adjustment of the initial focus position to an updated focus position. Another information processing apparatus includes circuitry that generates a virtual image of at least one object included in a first image of a scene from a different point of view. The generated virtual image is output for display with an indicator corresponding to an initial focus position within the scene of the first image. The indicator display is updated in response to an adjustment of the initial focus position to an updated focus position.

22 Claims, 7 Drawing Sheets

(56) References Cited

U.S. PATENT DOCUMENTS

| | | | | |
|---|---|---|---|---|
| 2006/0055814 A1* | 3/2006 | Okawa | ............... | H04N 5/23212 |
| | | | | 348/346 |
| 2012/0007942 A1* | 1/2012 | Michrowski | ........... | H04N 7/147 |
| | | | | 348/14.08 |
| 2012/0007997 A1* | 1/2012 | Oikawa | .................. | G03B 13/36 |
| | | | | 348/208.6 |
| 2015/0103223 A1* | 4/2015 | Park | ................... | H04N 5/23212 |
| | | | | 348/333.12 |

FOREIGN PATENT DOCUMENTS

| | | |
|---|---|---|
| JP | 2009-060338 A | 3/2009 |
| JP | 2010-010732 A | 1/2010 |
| JP | 2010-268052 A | 11/2010 |
| JP | 2013-026744 A | 2/2013 |
| JP | 2014-030181 A | 2/2014 |
| JP | 2014-055990 A | 3/2014 |
| JP | 2014-057294 A | 3/2014 |
| JP | 2014-096766 A | 5/2014 |
| WO | 2014/083737 A1 | 6/2014 |

OTHER PUBLICATIONS

Office Action for JP Patent Application No. 2014-124439, dated Sep. 25, 2018, 5 pages of Office Action and 3 pages of English Translation.

* cited by examiner

[Fig. 1]
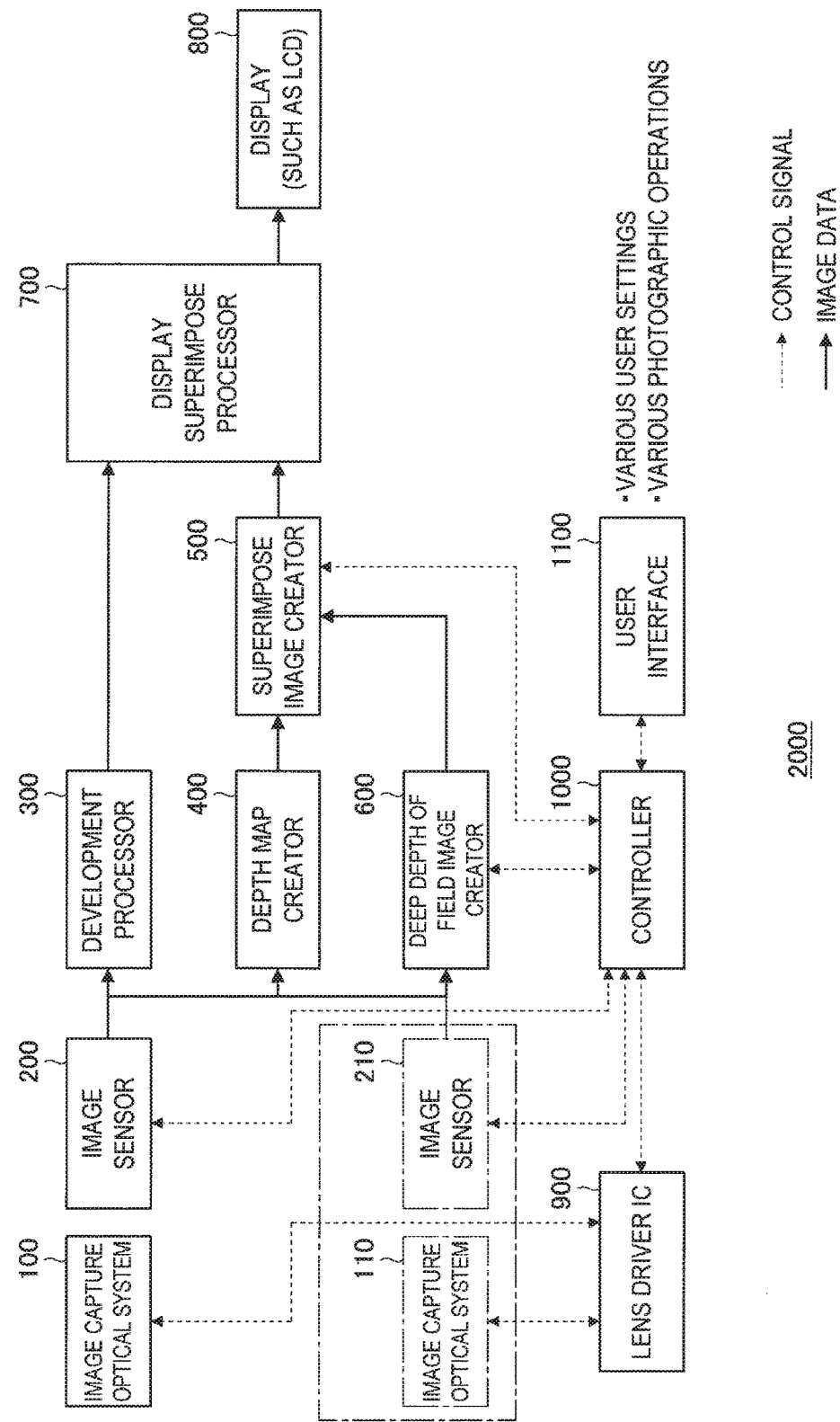

[Fig. 2]
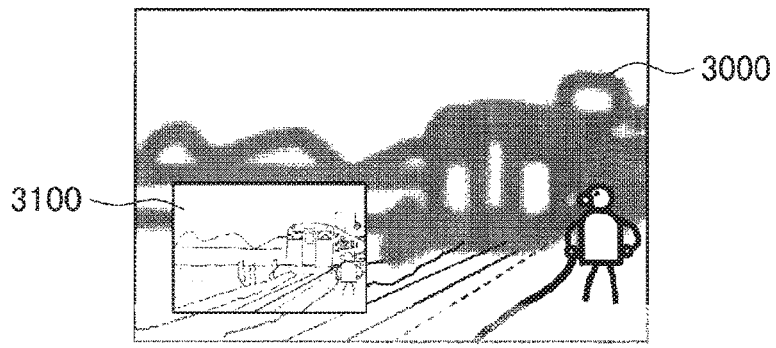
[Fig. 3]
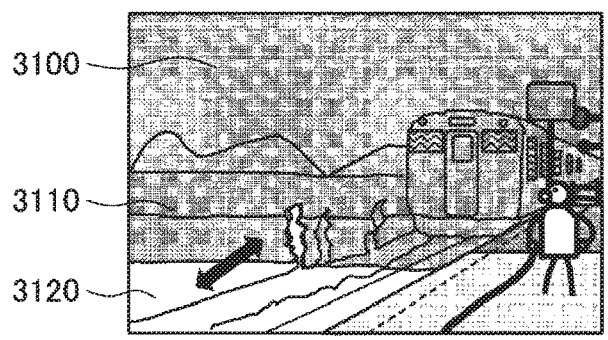
[Fig. 4]
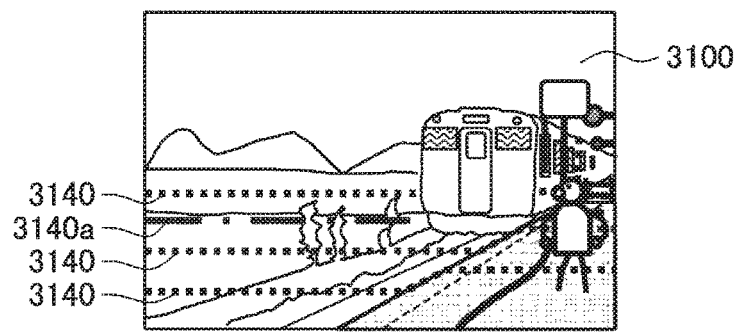
[Fig. 5]
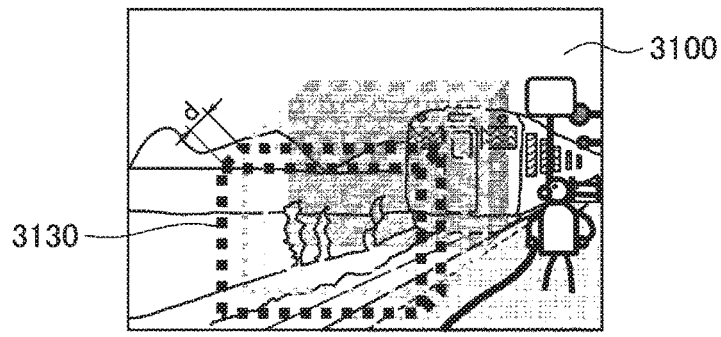

[Fig. 6]
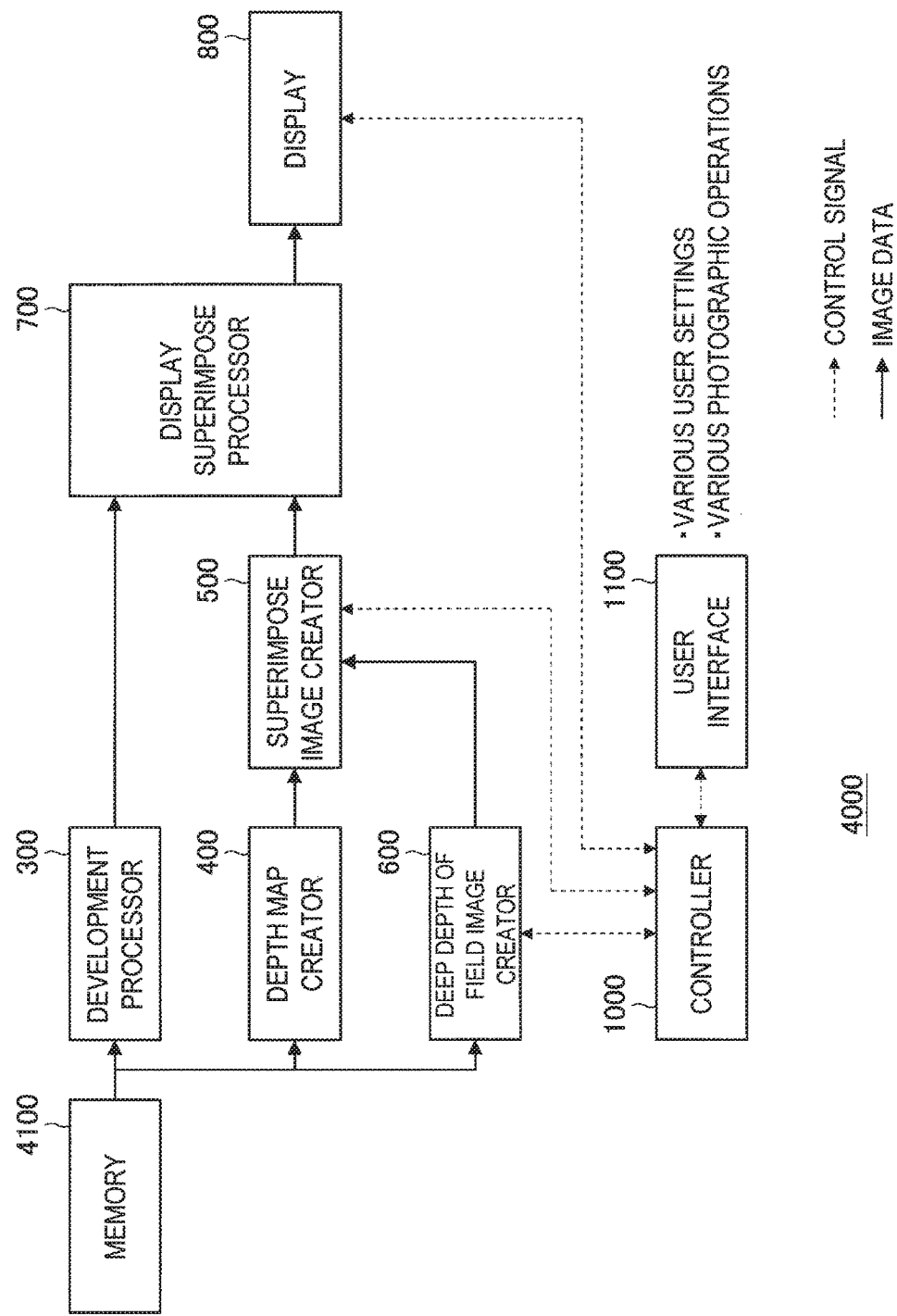

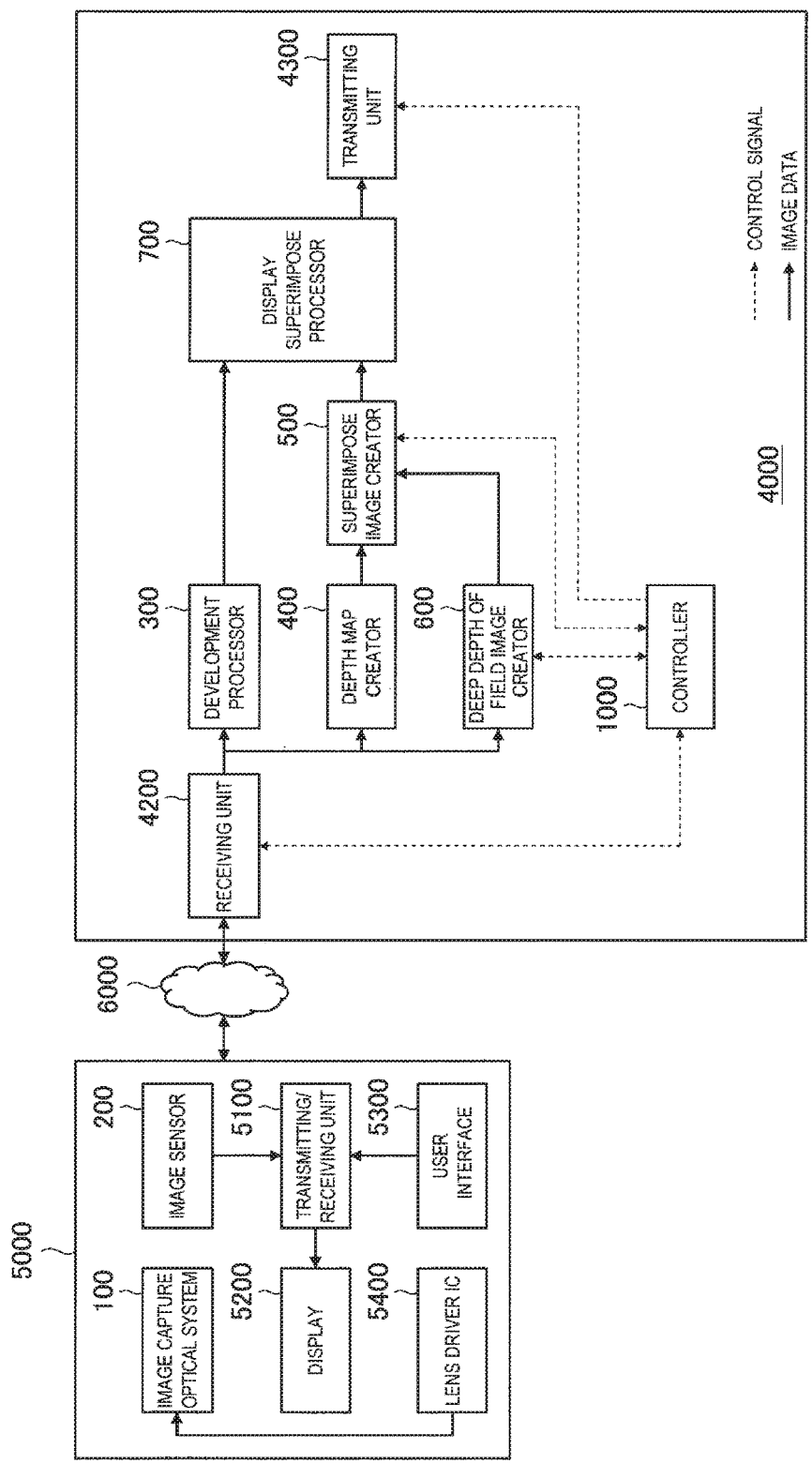

[Fig. 8]
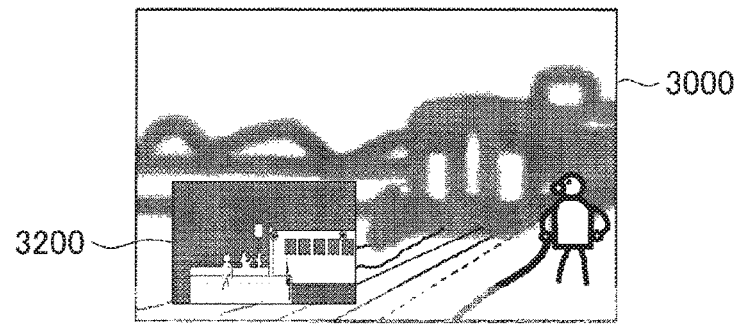
[Fig. 9]
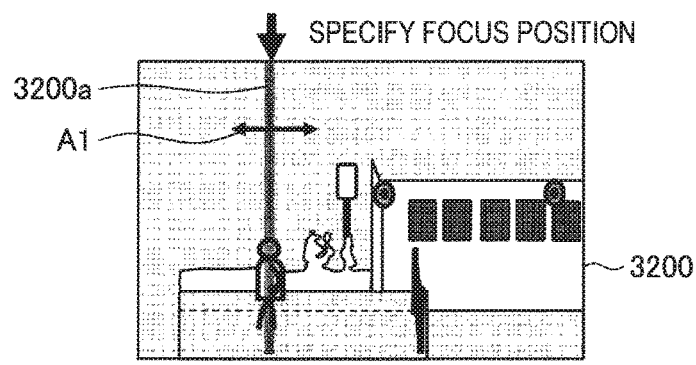
[Fig. 10]
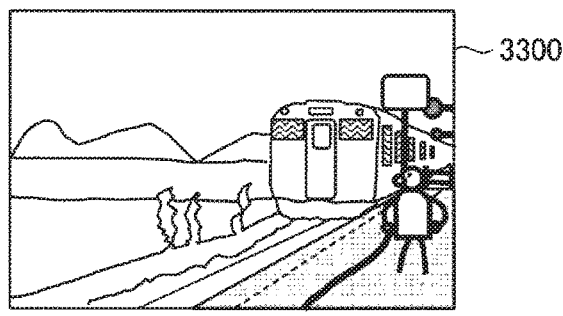
[Fig. 11]
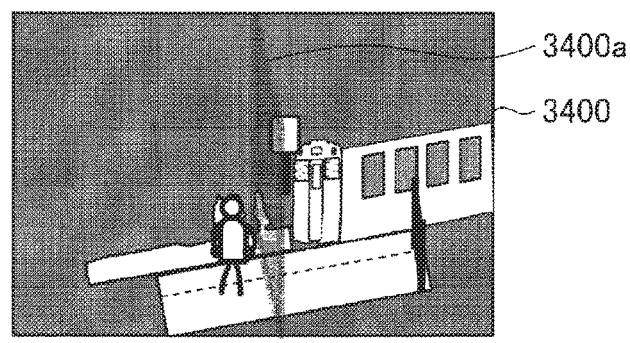

[Fig. 12]
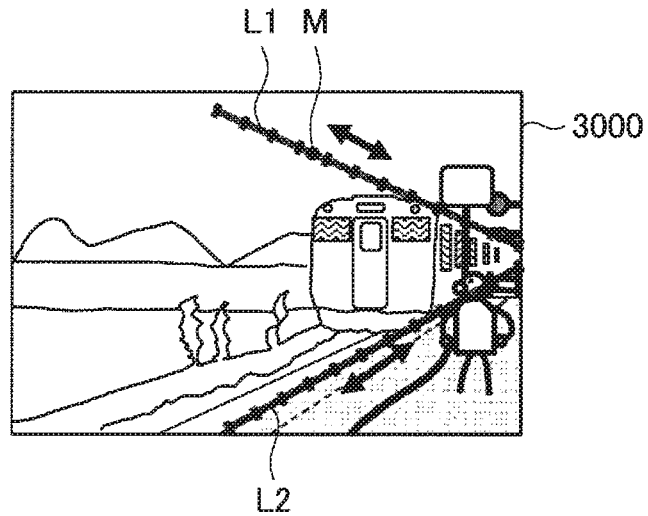
[Fig. 13]
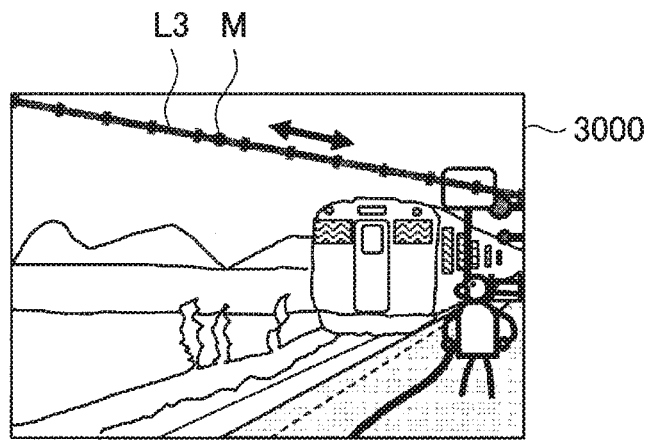
[Fig. 14]
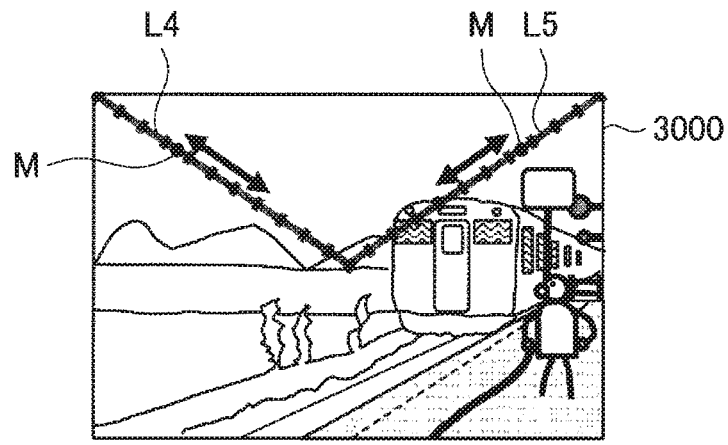

[Fig. 15]
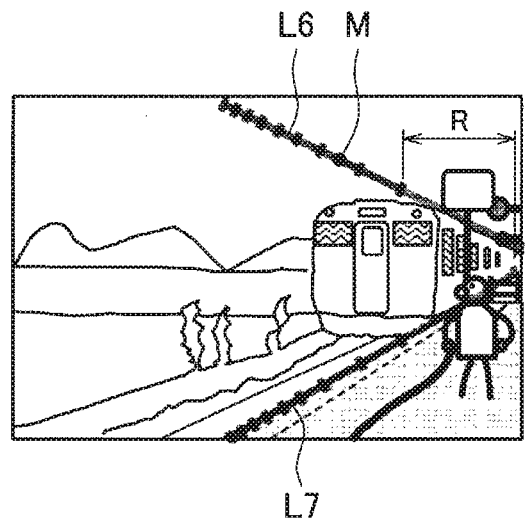
[Fig. 16]
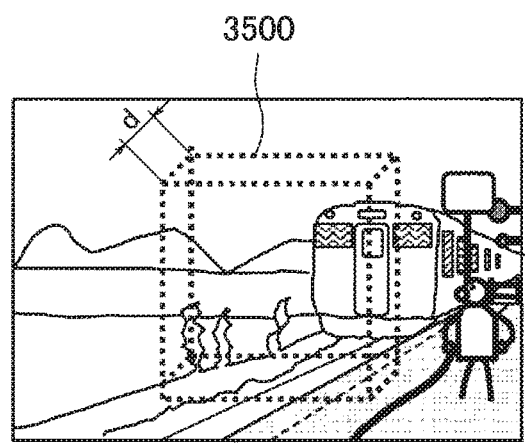
[Fig. 17]
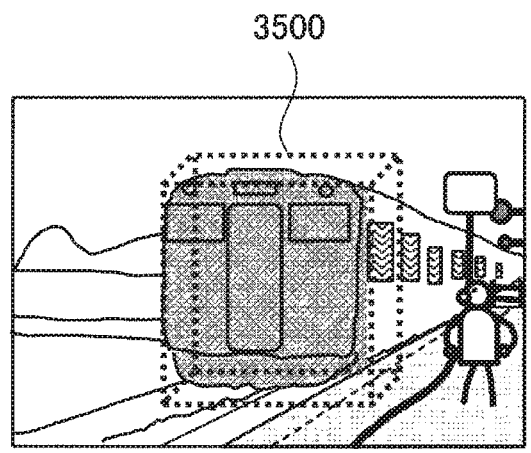

CONTROL DEVICE AND CONTROL METHOD

CROSS REFERENCE TO RELATED APPLICATIONS

This application is a U.S. National Phase of International Patent Application No. PCT/JP2015/002913 filed on Jun. 10, 2015, which claims priority benefit of Japanese Patent Application No. JP 2014-124439 filed in the Japan Patent Office on Jun. 17, 2014. Each of the above-referenced applications is hereby incorporated herein by reference in its entirety.

TECHNICAL FIELD

The present disclosure relates to a control device, a control method, and a program.

BACKGROUND ART

In the related art, Patent Literature 1 below describes superimposing information indicating the position of a focus point onto a displayed image in an electronic camera. Also, Patent Literature 2 below describes drawing a predetermined display object, which three-dimensionally expresses a position in a depth direction with respect to a device in a specified subject part, overlaid onto a through-the-lens image being displayed on an electronic viewfinder. Also, Patent Literature 3 below describes creating a pseudo-space and specifying a region with a stereoscopic icon.

CITATION LIST

Patent Literature

[PTL 1]
  JP 2013-26744A
[PTL 2]
  JP 2010-10732A
[PTL 3]
  JP 2009-60338A

SUMMARY

Technical Problem

The work of focusing with a device such as an image capture device is ordinarily conducted by specifying a subject position on a two-dimensional display screen. For example, if multiple persons appear on-screen, and one desires to focus on a specific person, that person may be focused by specifying the specific person on the screen.

However, if a subject does not exist at the desired depth position to be focused, it becomes extremely difficult for a user to specify a position in the depth direction while referring to the screen. With the technique of moving a stereoscopic icon as described in Patent Literature 3, it is difficult to intuitively and easily specify a position to be focused.

Furthermore, recently there has been a rise of photographic opportunities in shallow depth of field, thanks to the widespread adoption of full-size image sensors. However, under such conditions, it is difficult to determine the focus position when photographing, and difficult to determine where the focus position is without closely studying the photographed image. For example, when photographing a person's face, even if one focuses on the face while looking at the screen when photographing, in some cases it may be difficult to determine whether the focus is on the position of the eyes, the position of the nose, or the position of the ears.

Accordingly, when specifying a position to be focused, there is demand to intuitively and easily specify a position, including in the depth direction.

Solution to Problem

In one embodiment, there is provided an information processing apparatus including circuitry that is configured to output a first image for display with a first indicator that identifies an initial focus position within a scene of the first image and a second indicator that identifies at least one focus position that is in front of or behind the initial focus position within the scene. The circuitry is further configured to update the display of the first indicator in response to an adjustment of the initial focus position to an updated focus position.

In one embodiment, there is provided a method for setting a focus position within a scene. The method includes outputting, by circuitry of an information processing apparatus, a first image for display with a first indicator that identifies an initial focus position within the scene of the first image and a second indicator that identifies at least one focus position that is in front of or behind the initial focus position within the scene. The method further includes updating, by the circuitry, the display of the first indicator in response to an adjustment of the initial focus position to an updated focus position.

In one embodiment, there is provided a non-transitory computer-readable medium storing instructions which when executed by a computer causes the computer to perform a method for setting a focus position within a scene, the method includes outputting a first image for display with a first indicator that identifies an initial focus position within the scene of the first image and a second indicator that identifies at least one focus position that is in front of or behind the initial focus position within the scene. The method further includes updating the display of the first indicator in response to an adjustment of the initial focus position to an updated focus position.

In one embodiment, there is provided an information processing apparatus, including circuitry that is configured to generate a virtual image of at least one object included in a first image of a scene from a different point of view. The circuitry is configured to output the generated virtual image for display with an indicator corresponding to an initial focus position within the scene of the first image. Further, the circuitry is configured to update the display of the indicator in response to an adjustment of the initial focus position to an updated focus position.

In one embodiment, there is provided a method for setting a focus position within a scene, the method includes generating, by circuitry of an information processing apparatus, a virtual image of at least one object included in a first image of the scene from a different point of view. The generated virtual image is outputted by the circuitry for display with an indicator corresponding to an initial focus position within the scene of the first image. The method further includes updating, by the circuitry, the display of the indicator in response to an adjustment of the initial focus position to an updated focus position.

In one embodiment, there is provided a non-transitory computer-readable medium storing instructions which when executed by a computer causes the computer to perform a method for setting a focus position within a scene, the method includes generating a virtual image of at least one object included in a first image of the scene from a different point of view. The generated virtual image is outputted for display with an indicator corresponding to an initial focus position within the scene of the first image. The method further includes updating the display of the indicator in response to an adjustment of the initial focus position to an updated focus position Advantageous Effects of Invention According to an embodiment of the present disclosure as described above, when specifying a position to be focused, it is possible to intuitively and easily specify a position, including in the depth direction.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a diagram illustrating a schematic configuration of an image capture device according to embodiments of the present disclosure.

FIG. 2 is a diagram illustrating an image captured by an image capture device and displayed on a display in the first embodiment.

FIG. 3 is a diagram illustrating an AF image in detail.

FIG. 4 is a diagram illustrating an AF image in detail.

FIG. 5 is a diagram illustrating an AF image in detail.

FIG. 6 is a diagram illustrating an exemplary configuration of an editing device.

FIG. 7 is a diagram illustrating an exemplary configuration of an editing device.

FIG. 8 is a schematic diagram illustrating an image captured by an image capture device and displayed on a display in the second embodiment.

FIG. 9 is a diagram illustrating an image depicting a modified angle of view.

FIG. 10 is a diagram illustrating an image with a deep depth of field and no blur.

FIG. 11 is a diagram illustrating a state of moving the perspective in the direction of an angle smaller than 90 degrees with respect to the optical axis of the image capture optical system, and viewing a subject from that direction.

FIG. 12 is a schematic diagram illustrating an image captured by an image capture device and displayed on a display in the third embodiment.

FIG. 13 is a diagram illustrating a case in which a line segment extending in the depth direction does not exist in an image.

FIG. 14 is a diagram illustrating a case in which a line segment extending in the depth direction does not exist in an image.

FIG. 15 is a diagram illustrating an example of adding grid marks representing the resolution in the depth direction of the focus region to line segments L6 and L7.

FIG. 16 is a diagram for explaining a fourth embodiment.

FIG. 17 is a diagram for explaining the fourth embodiment.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.
1. First Embodiment
1.1. Exemplary configuration of image capture device
1.2. Examples of images with superimposed depth information
1.3. Exemplary application to device other than image capture device
2. Second Embodiment
2.1. Examples of images with superimposed depth information
3. Third Embodiment
3.1. Examples of images with superimposed depth information
4. Fourth Embodiment
4.1. Examples of images with superimposed depth information <1. First Embodiment>
1.1. Exemplary Configuration of Image Capture Device First, a schematic configuration of an image capture device 2000 according to embodiments of the present disclosure will be described with reference to FIG. 1. As illustrated in FIG. 1, the image capture device 2000 includes an image capture optical system 100, an image sensor 200, a development processor 300, a depth map creator 400, a superimpose image creator 500, a deep depth of field image creator 600, a display superimpose processor 700, a display 800, a lens driver IC 900, a controller 1000, and a user interface 1100. Additionally, the image capture device 2000 may also be equipped with an image capture optical system 110 and an image sensor 210.

A subject image is focused on the imaging surface of the image sensor 200 by the image capture optical system 100. The development processor 300 processes the raw data of the image capture obtained from the image sensor 200 to create an image file of a captured image, and sends the image file to the display superimpose processor 700.

The deep depth of field image creator 600 creates an image with a deep depth of field from the raw data of the image sent from the image sensor 200, and sends the created image to the superimpose image creator 500. The image creator 600 is equipped with a function that processes raw data similarly to the development processor 300. The image creator 600 creates an image with a deep depth of field, separately from the captured image processed by the development processor 300, from raw data captured by reducing the aperture diameter of the image capture optical system 100 compared to the captured image. In addition, if the image capture device 2000 is additionally equipped with an image capture optical system 110 and an image sensor 210, image creator 600 may also generate an image with a deep depth of field from an image separately captured using the image capture optical system 110 and the image sensor 210.

The depth map creator 400 creates a depth map with added information indicating the position of the subject in the depth direction for every pixel from the raw data of the image sent from the image sensor 200, and sends the created depth map to the superimpose image creator 500. If the image sensor 200 is made up of a phase differential sensor capable of acquiring phase difference information for each pixel, the depth map creator 400 creates a depth map from the phase difference information obtained from the image sensor 200. Also, if the image capture device 2000 is a stereo camera equipped with two image capture optical systems 100 and 110 and two image sensors 200 and 210, the depth map creator 400 creates a depth map from the parallax of each pixel captured by the image sensors 200 and 210. Also, if the image capture device 2000 is a light field camera capable of recording information for calculating depth information, the depth map creator 400 creates a depth map on the basis of such information.

The superimpose image creator 500 creates superimpose image data on the basis of the data of an image with a deep depth of field received from the image creator 600 and the information for specifying a focus position obtained from the depth map, and sends the created superimpose image data to the display superimpose processor 700. More specifically, the superimpose image creator 500 creates information for specifying a focus position from the depth map, and superimposes the information onto a deep depth of field image 3100 to create image data. Although described in detail later, the information for specifying a focus position is made up of information such as a virtual plane, contour lines, or a wireframe display indicating a focus position.

The display superimpose processor 700 superimposes the image data received from the development processor 300 with the image data received from the superimpose image creator 500, and creates display image data. The display 800 receives and displays the display image data from the display superimpose processor 700.

The user interface 1100 is a structural element that accepts operating input from a user, such as a touch sensor (touch panel), operating buttons, a keyboard, or a mouse. Through the user interface 1100, information such as various user settings and various photographic operations are input. The user is able to operate a display for specifying a focus position with a single action, such as by rotating a dial or pressing up and down on directional keys of the image capture optical system 110.

The controller 1000 controls the structural elements of the image capture device 2000. The controller 1000 receives information such as various user settings and various photographic operations from operating buttons or other user interface 1100, and controls the structural elements of the image capture device 2000. In addition, the controller 1000 sends commands to the lens driver IC 900, and drives the image capture optical system 100 so that the image capture optical system 100 reaches a desired zoom position and focus position.

In the present embodiment, information for specifying a focus position obtained from a depth map (information indicating a depth position) is superimposed onto an image, thereby enabling the user to specify a position in the depth direction of a captured image. The display state of the information for specifying a focus position changes according to the relationship between the focus position and the subject position. Consequently, the user becomes able to easily configure a focus position on a screen, and usability during focusing is greatly improved. Details are described below.

1.2. Examples of Images with Superimposed Depth Information

FIG. 2 is a diagram illustrating an image captured by the image capture device 2000 and displayed on the display 800 in the first embodiment. As illustrated in FIG. 2, an AF image 3100 with a deep depth of field is superimposed onto an image 3000 as a picture-in-picture (PinP). The image 3000 is a captured image processed by the development processor 300, and is an image capturing a subject according to user-desired parameters. In the present embodiment, suppose that the image 3000 is an image with a shallow depth of field. On the other hand, the AF image 3100 is an image obtained as a result of the superimpose image creator 500 superimposing an image created by the deep depth of field image creator 600 with information for specifying a focus position obtained from a depth map. In the AF image 3100, since the depth of field is deep, an image that is sharp over a wide range from close up to infinity is obtained. Meanwhile, the image 3000 captures the subject according to user-desired parameters, and is an image with a shallow depth of field focused on only part of the subject, while the rest of the subject is blurred. Since the AF image 3100 is a sharper image compared to the image 3000, the user is able to easily conduct a focusing operation while checking the image in the AF image 3100. The image illustrated in FIG. 2 is the output from the display 800 after the display superimpose processor 700 superimposes the image 3000 with the AF image 3100.

FIGS. 3 to 5 are diagrams illustrating the AF image 3100 in detail. The AF image 3100 is an image displayed to visually demonstrate where the focus position within a scene is on-screen, and is obtained by adding information for specifying a focus position from a depth map to the image with a deep depth of field created by the deep depth of field image creator 600. In the example illustrated in FIG. 3, a virtual plane (e.g., a first indicator) of the focus position is displayed in a space, and by altering the color (or density) in front of and behind the virtual plane (e.g., in front of or behind the focus position within a scene of the AF image), the user is able to visually grasp the virtual plane of the focus position. In the example illustrated in FIG. 3, a predetermined density (dots) (e.g., at least one second indicator) is added to the image 3110 that is behind the virtual plane of the focus position. The density illustrated in FIG. 3 may also be a predetermined color. Meanwhile, the image 3120 that is in front of the virtual plane of the focus position is still the original image, and a density is not added. The adding of density is conducted on the basis of depth information for each pixel of the depth map, so that density is added to pixels with depth information that is behind the virtual plane of the focus position, and density is not added to pixels with depth information that is in front of the virtual plane of the focus position. The position of the virtual plane of the focus position is acquired by the controller 1000 according to the position of a focus lens of the image capture optical system 100. The controller 1000 sends the position of the virtual plane of the focus position to the superimpose image creator 500. The superimpose image creator 500 creates image data by adding a predetermined density (dots) to the image 3110 that is behind the virtual plane, according to the position of the virtual plane of the focus position. In the example illustrated in FIG. 3, the density added on the basis of the depth information corresponds to the information for specifying a focus position from a depth map that is superimposed by the superimpose image creator 500.

Accordingly, the user viewing the AF image 3100 is able to recognize that the frontmost side of the image 3110 with added density is the focus position. The focus position may also be changed by operating the user interface 1100. If the focus position is changed, the position of the virtual plane of the focus position on the AF image 3100 changes. If the focus position is changed to be farther in front, density is newly added to the image 3120 in front that did not have added density, whereas if the focus position is changed to be farther behind, the density that was added to the image 3110 between the original focus position and the new focus position is removed. Consequently, when the focus position is changed, the user is able to easily distinguish the focus position on the AF image 3100 by visually noticing the region with newly added density, or the region with removed density. According to such a technique, when photographing a person's face, for example, by observing the regions of added (or removed) density while changing the focus position, it becomes possible to identify whether the focus is on the nose, the ears, or the like, making more precise focusing possible.

By having the user change the focus position to a desired position and then perform an operation that confirms the focus position, the focus position is configured to the desired position. Consequently, the position of the focus lens of the image capture optical system 100 is driven to a position corresponding to the user-configured focus position. In addition, the position of the focus lens may also be driven in conjunction with the operation of the user changing the focus position on the AF image 3100. The controller 1000 acquires information about the focus position configured by the operation of the user interface 1100, and sends a command to the lens driver IC 900 on the basis of the acquired information about the focus position. The focus lens of the image capture optical system 100 is driven to a position corresponding to the focus position by the lens driver IC 900.

In the example illustrated in FIG. 4, lines 3140 indicating the subject distance like a contour line display are displayed superimposed onto an image with a deep depth of field created by the image creator 600. In this case, by altering the line type or color between a line 3140*a* (e.g., a first indicator) corresponding to the focus position and the other lines 3140 (e.g., at least one second indicator that is in front of or behind the focus position within a scene of the AF image), the focus position may be indicated on-screen in a visual and easy-to-understand way. In the example illustrated in FIG. 4, the line corresponding to the focus position is displayed as a chain line, while the other lines are displayed as dotted lines. The adding of lines 3140 indicating the subject distance is conducted on the basis of the depth information for each pixel of the depth map, and by joining each pixel to other pixels with equal depth information, multiple lines 3140 expressing the subject distance may be displayed like a contour line display. In the example illustrated in FIG. 4, the lines 3140 indicating the subject distance correspond to the information for specifying a focus position from a depth map that is superimposed by the superimpose image creator 500.

Likewise in the example illustrated in FIG. 4, by having the user select an arbitrary line 3140 indicating a subject distance, the focus position may be changed to the position of the selected line 3140. Subsequently, by changing the focus position to a desired position and then performing an operation that confirms the focus position, the focus position is configured to the desired position. Consequently, the position of the focus lens of the image capture optical system 100 is driven to a position corresponding to the user-configured focus position. In addition, the position of the focus lens may also be driven in conjunction with the operation of the user changing the focus position on the AF image 3100.

Also, in the example illustrated in FIG. 5, the range of the focus position is indicated in the form of a wireframe display. In FIG. 5, the range of the rectangular cuboid 3130 (e.g., a first indicator) enclosed by the frontmost dotted lines corresponds to the focus position. A display is presented in which the thickness d in the depth direction of the rectangular cuboid 3130 enclosed by the dotted lines increases as the depth of field deepens. For this reason, the controller 1000 acquires an aperture diameter from the image capture optical system 100, and sends the acquired aperture diameter to the superimpose image creator 500. The superimpose image creator 500 creates image data by configuring the thickness d of the rectangular cuboid 3130 according to the aperture diameter. According to the example illustrated in FIG. 5, the user is able to recognize the focus position together with the depth of field. Similarly to FIG. 4, the adding of lines indicating the range of the rectangular cuboid 3130 is conducted on the basis of the depth information for each pixel of the depth map, and by joining pixels with equal depth information for multiple pieces of depth information, the range of the rectangular cuboid 3130 as illustrated in FIG. 5 may be displayed. In the example illustrated in FIG. 5, the lines (e.g., at least one second indicator that is in front of or behind the focus position within a scene of the AF image) indicating the range of the rectangular cuboid 3130 correspond to the information for specifying a focus position from a depth map that is superimposed by the superimpose image creator 500.

Likewise in the example illustrated in FIG. 5, by having the user change the position of the rectangular cuboid 3130 to a desired position and then perform an operation that confirms the focus position, the focus position is configured to the desired position. Consequently, the position of the focus lens of the image capture optical system 100 is driven to a position corresponding to the user-configured focus position. In addition, the position of the focus lens may also be driven in conjunction with the operation of the user changing the focus position on the AF image 3100. Also, if the user changes the width d of the rectangular cuboid 3130, the controller 1000 sends a command to the lens driver IC 900 on the basis of information of the width d, and changes the aperture diameter of the image capture optical system 100. Specifically, control is conducted so that the aperture diameter becomes smaller as the width d becomes larger. Consequently, the depth of field may be controlled by an operation on the screen.

1.3. Exemplary Application to Device Other than Image Capture Device

The embodiments discussed above describe the display of a focus position and focus position operations according to an embodiment of the present disclosure by taking the image capture device 2000 as an example, but the embodiments may also be applied to an editing device 4000 that edits a pre-captured image. In this case, the editing device 4000 includes the structural elements illustrated in FIG. 6.

The editing device 4000 stores pre-captured image data in memory 4100. The editing device 4000 is able to display the image illustrated in FIG. 2 on the display 800 by conducting processing similar to the processing discussed earlier on image data stored in the memory 4100. Subsequently, the user is able to configure the focus position to a desired position by operating the user interface 1100 while referring to the display 800.

For example, if the image data stored in the memory 4100 is data photographed with a light field camera, the focus position may be controlled to a desired position after the fact on the basis of the data for each pixel. A light field camera will now be described. A light field camera is established technology, in which a microlens array equipped with multiple microlenses is disposed in front of an image sensor. Each microlens has a different focal point, and by reconstructing a focal point image, it is possible to obtain images of various focus positions after photographing, without varying the focusing position of the image capture optical system. For example, if one microlens covers N pixels, the N microimages that may be obtained by arranging pixels at the same position with respect to the microlenses form N stereo image groups acquired by dividing the main lens into N partial apertures. Consequently, with a light field camera, it is also possible to create a depth map from parallax. If the image data stored in the memory 4100 is data photographed with a light field camera, information specifying a focus position as illustrated in FIGS. 3 to 5 may be superimposed onto image data and displayed, thereby making it possible to control the focus position to a desired position intuitively and easily. Note that in the case of the editing device 4000, only the focus position of the image data is changed after photographing, and a focus lens is not actually driven.

In addition, as illustrated in FIG. 7, the editing device 4000 may also be provided on a server in the cloud. In this case, the user sends image data captured with an electronic device 5000, such as a camera or smartphone equipped with the image capture optical system 100 and the image sensor 200, from a transmitting/receiving unit 5100, and image data is sent to the editing device 4000 via a network 6000. A receiving unit 4200 of the editing device 4000 receives the image data sent from the electronic device 5000. The editing device 4000 conducts a process similar to FIG. 1 on the received image data. A transmitting unit 4300 sends image data for display superimposed by the display superimpose processor 700 to the user's electronic device 5000 via the network 6000, and this image data is displayed on a display 5200 provided in the electronic device 5000. Additionally, the position of the focus lens of the image capture optical system 100 and operating input into a user interface 5300 are sent to the controller 1000 of the editing device 4000 via the network 6000. The controller 1000 computes a focus position according to the position of the focus lens, additionally computes a focus position according the operating input if an operation that changes the focus position is conducted, and sends a computed result to the electronic device 5000 via the network 6000. The electronic device 5000 receives the computed result of the focus position, and on the basis thereof, causes a lens driver IC 5400 to operate and drive the focus lens of the image capture optical system 100 to the focus position. Consequently, by displaying focus position information on a display device 800 similarly to the embodiments discussed earlier, the user is able to configure the focus position to a desired position while performing operations on-screen. Also, in the case of the configuration illustrated in FIG. 7, since the major computations are all conducted by the editing device 4000 on a server in the cloud, the electronic device 5000 may have a simple configuration.

According to the first embodiment as described above, because information for specifying a focus position obtained from a depth map is displayed superimposed onto an AF image 3100 with a deep depth of field, the user becomes able to easily recognize the focus position on the basis of the information for specifying a focus position. Also, by performing an operation on the basis of the information for specifying a focus position, the user becomes able to easily change the focus position. Consequently, the user is able to easily specify a focus position in the depth direction, and becomes able to easily distinguish the focus position visually.

Additionally, when specifying a focus position on-screen, if the focus position is displayed using a technique such as peaking (edge highlighting) of the subject, the focus position becomes displayed on the same screen, making it difficult to check the positional accuracy in the depth direction. According to a technique of the present embodiment, since depth information for specifying a focus position is superimposed, and the focus position is displayed according to the depth information, it becomes possible to ensure that the focus position is displayed with high positional accuracy in the depth direction.

Furthermore, an AF image 3100 is created separately from the image 3000 with a shallow depth of field that is the captured image, in which the AF image 3100 has a deeper depth of field than the image 3000. As a result, by referring to the AF image 3100, it becomes possible to reliably grasp the overall picture of the subject, making it easier to photograph with the intended composition. Also, by simultaneously looking at the image 3000 with a shallow depth of field and the AF image 3100 with a deep depth of field, it is possible to easily grasp the overall picture of the scene being photographed.

<2. Second Embodiment>

2.1. Examples of Images with Superimposed Depth Information

Next, the second embodiment of the present disclosure will be described. FIG. 8 is a diagram illustrating an image captured by the image capture device 2000 and displayed on the display 800 in the second embodiment. As illustrated in FIG. 8, an image 3200 depicting a modified angle of view is superimposed onto an image 3000 with a shallow depth of field as a picture-in-picture (PinP).

FIG. 9 is a diagram illustrating the image 3200. The image 3200 is virtually created by moving the perspective of the image 3000 being captured in the horizontal direction in order to specify a focus position. The image 3200 is created by the superimpose image creator 500 on the basis of depth map information. The display superimpose processor 700 superimposes the image 3000 with the image 3200. In the example illustrated in FIG. 9, the image 3200 is created as an image indicating the state of moving the perspective in a direction orthogonal to the optical axis of the image capture optical system 100 and viewing the subject from a direction orthogonal to the optical axis. The creation of the image 3200 may be conducted on the basis of depth map information using established light field technology, for example. The display superimpose processor 700 conducts a process of superimposing the image 3000 with the image 3200. In the second embodiment, since the position of the subject in the depth direction may be distinguished from the image 3200, the image creator 600 may also not create an image with a deep depth of field. When creating the image 3200, an image 3300 with a deep depth of field and no blur as illustrated in FIG. 10 may be used. The image 3300 may be acquired similarly to the image 3100 described in the first embodiment.

Since the image 3200 virtually alters the perspective of the image 3300, objects not depicted in the frame of the original image 3300 are not displayed in the image 3200, and a color such as gray is added to regions that are not displayed. Since the direction in which the subject is viewed in the image 3200 differs from the image 3000, the user becomes able to recognize the position of the subject in the depth direction from a direction orthogonal to the optical axis direction of the image capture optical system 100. Consequently, by referring to the image 3200, the position of each subject in the depth direction within the image 3000 may be easily recognized visually.

Also, in the image 3200, the focus position is indicated by a bold line 3200a. In addition, the width of the bold line 3200a (the width in the depth direction of the optical axis of the image capture optical system 100) is displayed differently according to the magnitude of the depth of field. The user is able to recognize the focus position and the depth of field from the position and width of the bold line 3200*a*. Similarly to the first embodiment, the focus position is acquired by the controller 1000 according to the position of the focus lens of the image capture optical system 100. The controller 1000 sends the focus position to the superimpose image creator 500. The superimpose image creator 500 creates image data by configuring the position of the bold line 3200*a* according to the focus position. Additionally, the controller 1000 acquires an aperture diameter from the image capture optical system 100, and sends the acquired aperture diameter to the superimpose image creator 500. The superimpose image creator 500 creates image data by configuring the width bold line 3200*a* according to the aperture diameter.

In addition, the user is able to change the position of the bold line 3200*a* indicating the focus position in the direction of the arrow A1 by operating the user interface 1100. Subsequently, similarly to the first embodiment, by having the user control the position of the bold line 3200*a* to change the focus position to a desired position, and then perform an operation that confirms the focus position, the focus position is configured to the desired position. Consequently, the position of the focus lens of the image capture optical system 100 is driven to a position corresponding to the user-configured focus position. In addition, the position of the focus lens may also be driven in conjunction with the operation of the user controlling the position of the bold line 3200*a* to change the focus position. Furthermore, similarly to the first embodiment, changing the depth of field by controlling the width of the bold line 3200*a* may also be enabled.

Additionally, the image 3400 illustrated in FIG. 11 is created as an image illustrating the state of moving the perspective in the direction of an angle smaller than 90 degrees with respect to the optical axis of the image capture optical system 100, and viewing the subject from that direction. In this case, since the "train" subject is perceived from a direction of an angle smaller than 90 degrees with respect to the optical axis, the image 3400 depicts a state of viewing the front face of the "train" from an oblique direction. On the other hand, since the image 3200 is an image in which the "train" subject is perceived from a direction orthogonal to the optical axis of the image capture optical system 100, the image 3200 does not depict the front face of the "train". As illustrated in the image 3400 of FIG. 11, in the case of perceiving a subject from the direction of an angle smaller than 90 degrees with respect to the optical axis, it is likewise possible to easily and visually recognize the position of the subject in the depth direction.

Since the image 3400 illustrated in FIG. 11 is an image in which the subject is viewed from an angle smaller than 90 degrees with respect to the optical axis of the image capture optical system 100, as illustrated in FIG. 11, the specified focus position is displayed as a plane 3400*a* indicating the focus position. Likewise in the image 3400, by having the user control the position and width of the plane 3400*a* in the optical axis direction, the focus position and the depth of field may be adjusted to a desired state.

According to the second embodiment as described above, images 3200 and 3400 depicting an image with a modified angle of view are created and displayed superimposed onto an image 3000 with a shallow depth of field. Consequently, the user becomes able to recognize the position of the subject in the depth direction from a direction that differs from the optical axis direction of the image capture optical system 100. Also, in the images 3200 and 3400, the specified focus position is indicated with a bold line 3200*a* or a plane 3400*a*, and by controlling the position of the bold line 3200*a* or the plane 3400*a*, adjusting the focus position becomes possible. Also, by adjusting the width of the bold line 3200*a* or the plane 3400*a* in the optical axis direction, adjusting the depth of field becomes possible.

<3. Third Embodiment>

3.1. Examples of Images with Superimposed Depth Information

Next, the third embodiment of the present disclosure will be described. FIG. 12 is a diagram illustrating an image captured by the image capture device 2000 and displayed on the display 800 in the third embodiment. As illustrated in FIG. 12, line segments L1 and L2 extending in the depth direction of the subject are extracted from the image 3000, and grid marks (scale marks) are displayed on the line segments L1 and L2. The process for displaying grid marks is conducted by the superimpose image creator 500 on the basis of depth information for each pixel of the depth map. Numerical values indicating the distance from the image capture device 2000 may also be displayed together with the grid marks. The display superimpose processor 700 conducts a process of superimposing the image 3000 with grid marks obtained from the depth map. Likewise in the third embodiment, the image creator 600 may also not create an image with a deep depth of field, but an image with a deep depth of field may be created and superimposed with grid marks. In the third embodiment, the grid marks on the lines segments L1 and L2 become the information for specifying a focus position from a depth map. Similarly to the first and second embodiments, the controller 1000 acquires the focus position according to the position of the focus lens of the image capture optical system 100. The controller 1000 sends the focus position to the superimpose image creator 500. The superimpose image creator 500 displays a mark M indicating the focus position no the line segments L1 and L2 according to the focus position. The user, by controlling the position of the mark M on the line segments L1 and L2, is able to one-dimensionally control which position on the line segments L1 and L2 with added grid marks specifies the position of focus.

As illustrated in FIG. 12, the line segments L1 and L2 following the edges on the side of the "train" subject are extracted from the image 3000, and grid marks are added to the extracted line segments on the basis of depth map information. The user is able to specify the focus position (the position of the mark M) by operating the user interface 1100, selecting a desired line segment from among the multiple extracted line segments, and specifying an added grid mark. Similarly to the first and second embodiments, the controller 1000 controls the lens driver IC 900 on the basis of the operation of specifying the focus position by the user, thereby causing the focus lens of the image capture optical system 100 to move to the specified focus position.

FIGS. 13 and 14 illustrate cases in which a line segment extending in the depth direction does not exist in the image 3000. In this case, as illustrated in FIGS. 13 and 14, arbitrary line segments L3, L4, and L5 that are not directly associated with the shape or contours of the subject in the image 3000 are added to the image 3000. The line segments L3, L4, and L5 may be added at predetermined positions, or added at arbitrary positions by having the user specify a start point and an end point. The line segments L3, L4, and L5 are treated as line segments extending from the edge of the frame to infinity, and grid marks are added similarly to FIG.

12. Similarly to FIG. 12, the user is able to specify a focus position by specifying the position of a grid marks on the line segments L3, L4, and L5 in the image 3000. The controller 1000 controls the lens driver IC 900 on the basis of the user's operation, thereby causing the focus lens of the image capture optical system 100 to move to the specified focus position.

FIG. 15 is a diagram illustrating an example of adding grid marks representing the resolution in the depth direction of the focus region to line segments L6 and L7. When the subject distance is farther than a predetermined distance, everything becomes focused, similarly to when the subject distance is infinity, and the specification of a focus region becomes unavailable. The grid marks added to the line segments L6 and L7 illustrated in FIG. 15 have a wider spacing as the distance increases, and in the region R illustrated in FIG. 15, no grid marks are added, which indicates that everything is in focus. Consequently, by looking at the grid marks added to L6 and L7, the user is able to recognize regions in the depth direction where the resolution is the same, and if an arbitrary position inside the region R is specified as the focus position, the user is able to recognize that the entirety of the region R is in focus.

According to the third embodiment as described above, line segments extending in the depth direction are configured in the image 3000, grid marks (scale marks) are displayed on the line segments, and a position specified by the user on a grid mark is treated as the specified focus position. As a result, by specifying a grid mark on a line segment extending in the depth direction, the user becomes able to configure the focus position easily. Consequently, it becomes possible to specify a focus position more intuitively and easily compared to a technique of specifying a focus position by specifying a subject two-dimensionally on a screen.

<4. Fourth Embodiment>

4.1. Examples of Images with Superimposed Depth Information

Next, the fourth embodiment of the present disclosure will be described. FIGS. 16 and 17 are diagrams for explaining the fourth embodiment. As illustrated in FIG. 16, in the fourth embodiment, the user interface of one of the first to third embodiments is used to preconfigure a rectangular cuboid (wireframe) 3500 indicating the focus position at an arbitrary position in the depth direction. In the example illustrated in FIG. 16, the rectangular cuboid 3500 includes a width d in the depth direction, similarly to the example of FIG. 5 described in the first embodiment. The width d in the depth direction of the rectangular cuboid 3500 corresponds to the magnitude of the depth of field. The controller 1000 acquires the focus position according to the position of the focus lens of the image capture optical system 100, and also acquires the aperture diameter of the image capture optical system 100. The controller 1000 sends the acquired focus position and aperture diameter to the superimpose image creator 500. The superimpose image creator 500 configures and displays the position of the rectangular cuboid 3500 in the depth direction according to the acquired focus position. In addition, the superimpose image creator 500 configures and displays the width d of the rectangular cuboid 3500 according to the aperture diameter. In the fourth embodiment, the rectangular cuboid 3500 corresponds to the information specifying a focus position.

As illustrated in FIG. 17, automatic photographing is conducted when a subject with movement reaches the configured rectangular cuboid 3500. The superimpose image creator 500 detects that a subject with movement has reached the position of the rectangular cuboid 3500 in the depth direction. The controller 1000 receives, from the superimpose image creator 500, information indicating that a subject with movement has reached the position of the rectangular cuboid 3500 in the depth direction. The controller 1000 receives the information, and controls the image sensor 200 to conduct photographing. As a result, it is possible to automatically conduct photographing when a subject with movement reaches a rectangular cuboid 3500 indicating a focus position, making it possible to easily photograph a subject that is advancing towards the photographer.

Note that the subject with movement may be decided as the primary subject by the image capture device 2000 with image recognition technology, or decided as the primary subject by the user.

The example illustrated in FIG. 17 illustrates a "train" as the subject with movement. As illustrated in FIG. 17, the color of the subject is modified for only the part of the "train" subject that inters the rectangular cuboid 3500 indicating the focus position. Consequently, the user is able to perceive which part of the subject enters the rectangular cuboid 3500 indicating the focus region. Additionally, when automatic photographing is not conducted, it becomes possible to easily photograph an image with the front face of the "train" in focus by pressing the shutter at the moment the front face of the "train" subject enters the rectangular cuboid 3500 and changes color. Similarly to the embodiments discussed earlier, the position of the rectangular cuboid 3500 may be changed by having the user operate the user interface 1100, and the depth of field may also be adjusted by changing the width d of the rectangular cuboid 3500.

According to the fourth embodiment as described above, by preconfiguring a rectangular cuboid 3500 indicating the focus position in an image, automatic photographing may be conducted when a subject with movement enters the rectangular cuboid 3500. Consequently, it is possible to specify a focus position using what is called single-point focus on a space without a target object. Also, by modifying the color of only the part of the displayed subject that enters the rectangular cuboid 3500 indicating the focus position, the user becomes able to perceive which part of the subject has entered the rectangular cuboid indicating the focus position. Consequently, even in the case of not conducting automatic photographing, it becomes possible to photograph an image in which the desired subject is reliably in focus.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An information processing apparatus, including circuitry configured to output a first image for display with a first indicator that identifies an initial focus position within a scene of the first image and a second indicator that identifies at least one focus position that is in front of or behind the initial focus position within the scene; and update the display of the first indicator in response to an adjustment of the initial focus position to an updated focus position.

(2). The information processing apparatus according to feature (1), in which a portion of the displayed first image that is behind the focus position corresponding to the first indicator is shaded.

(3) The information processing apparatus according to feature (1) or (2), in which the circuitry is configured to: output a plurality of second indicators that corresponds to a plurality of different focus positions, within the scene, with the first image.

(4) The information processing apparatus according to feature (3), in which each of the second indicators is a line, plane, or a box.

(5) The information processing apparatus according any one of features (1) to (4), in which the second indicator corresponds to one of a plurality of focus positions within the scene that is identified by a line segment, which is displayed with the first image.

(6) The information processing apparatus according to feature (5), in which the line segment is aligned with an object included in the first image.

(7) The information processing apparatus according to any one of features (1) to (6), in which the initial focus position corresponds to a focus position of a lens used to capture the scene.

(8) The information processing apparatus according to any one of features (1) to (7), in which the circuitry is configured to: determine whether an object reaches a region of the scene located at the focus position corresponding to the first indicator; and generate a second image in response to the determination.

(9) The information processing apparatus according to any one of features (1) to (8), in which the circuitry is configured to: update the display of the first indicator in response to the adjustment of the initial focus position to the updated focus position according to a user input.

(10) The information processing apparatus according to any one of features (1) to (9), in which the circuitry is configured to: cause a lens to be driven according to the updated focus position corresponding to the displayed first indicator.

(11) The information processing apparatus according to any one of features (1) to (10), in which the circuitry is configured to: generate a second image of the scene based on the updated focus position corresponding to the displayed first indicator.

(12) The information processing apparatus according to feature (11), further including an image sensor configured to capture the second image.

(13) An information processing apparatus, including circuitry configured to generate a virtual image of at least one object included in a first image of a scene from a different point of view; output the generated virtual image for display with an indicator corresponding to an initial focus position within the scene of the first image; and update the display of the indicator in response to an adjustment of the initial focus position to an updated focus position.

(14) The information processing apparatus according to feature (13), in which the virtual image is a cross-sectional view of the at least one object.

(15) The information processing apparatus according to feature (13) or (14), in which the circuitry is configured to: update the display of the indicator in response to the adjustment of the initial focus position to the updated focus position according to a user input.

(16) The information processing apparatus according to any one of features (13) to (15), in which the circuitry is configured to: cause a lens to be driven according to the updated focus position corresponding to the displayed indicator.

(17) The information processing apparatus according to any one of features (13) to (16), in which the circuitry is configured to: generate a second image of the scene based on the updated focus position corresponding to the displayed indicator.

(18) The information processing apparatus according to feature (17), further including an image sensor configured to capture the second image.

(19) A method for setting a focus position within a scene, the method including outputting, by circuitry of an information processing apparatus, a first image for display with a first indicator that identifies an initial focus position within the scene of the first image and a second indicator that identifies at least one focus position that is in front of or behind the initial focus position within the scene; and updating, by the circuitry, the display of the first indicator in response to an adjustment of the initial focus position to an updated focus position.

(20) A method for setting a focus position within a scene, the method including generating, by circuitry of an information processing apparatus, a virtual image of at least one object included in a first image of the scene from a different point of view; outputting, by the circuitry, the generated virtual image for display with an indicator corresponding to an initial focus position within the scene of the first image; and updating, by the circuitry, the display of the indicator in response to an adjustment of the initial focus position to an updated focus position

(21) A non-transitory computer-readable medium storing instructions which when executed by a computer causes the computer to perform a method for setting a focus position within a scene, the method including outputting a first image for display with a first indicator that identifies an initial focus position within the scene of the first image and a second indicator that identifies at least one focus position that is in front of or behind the initial focus position within the scene; and updating the display of the first indicator in response to an adjustment of the initial focus position to an updated focus position.

(22) A non-transitory computer-readable medium storing instructions which when executed by a computer causes the computer to perform a method for setting a focus position within a scene, the method including generating a virtual image of at least one object included in a first image of the scene from a different point of view; outputting the generated virtual image for display with an indicator corresponding to an initial focus position within the scene of the first image; and updating the display of the indicator in response to an adjustment of the initial focus position to an updated focus position.

(23) A control device including:
a depth information acquisition unit configured to acquire depth information of a subject in a captured image; and
a display processing unit configured to conduct a process to superimpose and display the captured image or an image corresponding to the captured image with information for specifying a focus position obtained from the depth information, and change a display state of the information for specifying the focus position according to a relationship between the focus position and subject position.

(24) The control device according to (23), further including:
an operating input unit configured to accept input of a user operation,
wherein the display processing unit changes and displays the focus position according to a user operation.
(25) The control device according to (23) or (24), wherein the display processing unit conducts a process to display a line or plane indicating the focus position on the basis of the depth information.
(26) The control device according to (25), wherein the display processing unit conducts a process to add a predetermined color or density to the line or plane indicating the focus position.
(27) The control device according to (25), wherein the display processing unit imparts a width according to a depth of field to the line or plane indicating the focus position.
(28) The control device according to (27), wherein when a subject with movement reaches the line or plane indicating the focus position, the display processing unit changes a color or density of a member of the subject that has reached the line or plane indicating the focus position.
(29) The control device according to (23), wherein the display processing unit conducts a process to display a line or plane equidistant from an image capture position on the basis of the depth information.
(30) The control device according to (23), wherein the display processing unit conducts a process to display, on the basis of the captured image and the depth information, an image from a different perspective than the captured image as the information for specifying the focus position.
(31) The control device according to (23), wherein the display processing unit conducts a process to display a line segment extending into a captured image together with the focus position on the basis of the depth information.
(32) The control device according to (31), wherein the line segment includes grid marks indicating depth position.
(33) The control device according to (31), wherein the line segment corresponds to an edge part that extends in a depth direction of the subject.
(34) The control device according to (31), wherein the line segment is preconfigured at a predetermined position in the captured image or the image corresponding to the captured image.
(35) The control device according to (31), further including:
an operating input unit configured to accept input of a user operation,
wherein the line segment is configured by having a user stipulate a start point and an end point in the captured image or the image corresponding to the captured image.
(36) The control device according to (24), further including:
an image sensor configured to capture the captured image or the image corresponding to the captured image;
an image capture optical system configured to focus a subject image onto an imaging surface of the image sensor; and
a driving unit configured to drive the image capture optical system according to the focus position in response to the user operation.
(37) The control device according to any one of (23) to (36), wherein
the image corresponding to the captured image is an image with a deeper depth of field than the captured image.
(38) A control method including:
acquiring depth information of a subject in a captured image;
superimposing and displaying the captured image or an image corresponding to the captured image with information for specifying a focus position obtained from the depth information; and changing a display state of the information for specifying the focus position according to a relationship between the focus position and subject position.
(39) A program causing a computer to function as:
a device configured to acquire depth information of a subject in a captured image;
a device configured to superimpose and display the captured image or an image corresponding to the captured image with information for specifying a focus position obtained from the depth information; and
a device configured to change a display state of the information for specifying the focus position according to a relationship between the focus position and subject position.

REFERENCE SIGNS LIST

400 depth map creator
500 superimpose image creator
2000 image capture device
4000 editing device

The invention claimed is:

1. An information processing apparatus, comprising:
circuitry configured to:
control a display device to display a first image with a first indicator and a second indicator,
wherein the first indicator identifies an initial focus position within a scene of the first image, and the second indicator identifies at least one focus position that is one of in front of a virtual plane of the initial focus position within the scene or behind the virtual plane of the initial focus position within the scene, and
wherein the virtual plane of the initial focus position is parallel to a display plane of the display device; and
update the display of the first indicator based on an adjustment of the initial focus position to an updated focus position.

2. The information processing apparatus according to claim 1, wherein a portion of the first image behind the initial focus position is shaded.

3. The information processing apparatus according to claim 1, wherein the circuitry is further configured to:
display a plurality of second indicators with the first image,
wherein the plurality of second indicators corresponds to a plurality of focus positions within the scene.

4. The information processing apparatus according to claim 3, wherein each second indicator of the plurality of second indicators is one of a line, a plane, or a box.

5. The information processing apparatus according to claim 1,
wherein the second indicator corresponds to one of a plurality of focus positions within the scene, and
wherein the second indicator is identified by a line segment displayed with the first image.

6. The information processing apparatus according to claim 5, wherein the line segment is aligned with an object included in the first image.

7. The information processing apparatus according to claim 1, wherein the initial focus position corresponds to a focus position of a lens that captures the scene.

8. The information processing apparatus according to claim 1, wherein the circuitry is further configured to:

determine that an object reaches a region of the scene, wherein the region is located at the initial focus position; and generate a second image based on the determination.

9. The information processing apparatus according to claim 1, wherein the circuitry is further configured to:

update the display of the first indicator based on the adjustment of the initial focus position to the updated focus position, wherein the adjustment of the initial focus position is based on a user input.

10. The information processing apparatus according to claim 1, wherein the circuitry is further configured to:

control a driver module to drive a lens based on the updated focus position corresponding to the displayed first indicator.

11. The information processing apparatus according to claim 1, wherein the circuitry is further configured to:

generate a second image of the scene based on the updated focus position corresponding to the displayed first indicator.

12. The information processing apparatus according to claim 11, further comprising:

an image sensor configured to capture the second image.

13. An information processing apparatus, comprising: circuitry configured to:

generate a virtual image of at least one object included in a first image of a scene from a first point of view;

control a display device to display the virtual image with a first indicator and a second indicator, wherein the first indicator corresponds to an initial focus position within the scene of the first image, and the second indicator identifies at least one focus position that is one of in front of a virtual plane of the initial focus position within the scene or behind the virtual plane of the initial focus position within the scene, and wherein the virtual plane of the initial focus position is parallel to a display plane of the display device; and update the display of the first indicator based on an adjustment of the initial focus position to an updated focus position.

14. The information processing apparatus according to claim 13, wherein the virtual image is a cross-sectional view of the at least one object.

15. The information processing apparatus according to claim 13, wherein the circuitry is further configured to:

update the display of the first indicator based on the adjustment of the initial focus position to the updated focus position, wherein the adjustment of the initial focus position is based on a user input.

16. The information processing apparatus according to claim 13, wherein the circuitry is further configured to:

control a driver module to drive a lens based on the updated focus position corresponding to the displayed first indicator.

17. The information processing apparatus according to claim 13, wherein the circuitry is further configured to:

generate a second image of the scene based on the updated focus position, wherein the updated focus position corresponds to the displayed first indicator.

18. The information processing apparatus according to claim 17, further comprising:

an image sensor configured to capture the second image.

19. A method for setting a focus position within a scene, the method comprising:

controlling, by circuitry of an information processing apparatus, a display device to display a first image with a first indicator and a second indicator, wherein the first indicator identifies an initial focus position within a scene of the first image, and the second indicator identifies at least one focus position that is one of in front of a virtual plane of the initial focus position within the scene or behind the virtual plane of the initial focus position within the scene, and wherein the virtual plane of the initial focus position is parallel to a display plane of the display device; and updating, by the circuitry, the display of the first indicator based on an adjustment of the initial focus position to an updated focus position.

20. A method for setting a focus position within a scene, the method comprising:

generating, by circuitry of an information processing apparatus, a virtual image of at least one object included in a first image of the scene from a first point of view;

controlling, by the circuitry, a display device to display the generated virtual image with a first indicator and a second indicator, wherein the first indicator corresponds to an initial focus position within the scene of the first image, and the second indicator identifies at least one focus position that is one of in front of a virtual plane of the initial focus position within the scene or behind the virtual plane of the initial focus position within the scene, and wherein the virtual plane of the initial focus position is parallel to a display plane of the display device; and updating, by the circuitry, the display of the first indicator based on an adjustment of the initial focus position to an updated focus position.

21. A non-transitory computer-readable medium having stored thereon, computer-executable instructions which when executed by a computer cause the computer to execute operations, the operations comprising:

controlling a display device to display a first image with a first indicator and a second indicator, wherein the first indicator identifies an initial focus position within a scene of the first image, and the second indicator identifies at least one focus position that is one of in front of a virtual plane of the initial focus position within the scene or behind the virtual plane of the initial focus position within the scene, and wherein the virtual plane of the initial focus position is parallel to a display plane of the first image; and updating the display of the first indicator based on an adjustment of the initial focus position to an updated focus position.

22. A non-transitory computer-readable medium having stored thereon, computer-executable instructions which when executed by a computer cause the computer to execute operations, the operations comprising:

generating a virtual image of at least one object included in a first image of a scene from a first point of view;

controlling a display device to display the generated virtual image with a first indicator and a second indicator, wherein the first indicator corresponds to an initial focus position within the scene of the first image, and the second indicator identifies at least one focus position that is one of in front of a virtual plane of the initial focus position within the scene or behind the virtual plane of the initial focus position within the scene, and wherein the virtual plane of the initial focus position is parallel to a display plane of the generated virtual image; and updating the display of the first indicator based on an adjustment of the initial focus position to an updated focus position.

* * * * *